United States Patent
Diekhans

(10) Patent No.: US 7,337,023 B2
(45) Date of Patent: Feb. 26, 2008

(54) SCALABLE FUNCTIONALITY WINDOWS IN A DISPLAY UNIT

(75) Inventor: Norbert Diekhans, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 312 days.

(21) Appl. No.: 11/235,909

(22) Filed: Sep. 27, 2005

(65) Prior Publication Data

US 2006/0069485 A1  Mar. 30, 2006

(30) Foreign Application Priority Data

Sep. 30, 2004  (DE) .................. 10 2004 048 083

(51) Int. Cl.
*G05B 13/02* (2006.01)
(52) U.S. Cl. ....................................... 700/52
(58) Field of Classification Search ................. 700/170
See application file for complete search history.

(56) References Cited

U.S. PATENT DOCUMENTS

| | | | |
|---|---|---|---|
| 5,001,697 A | 3/1991 | Torres | |
| 5,060,170 A | 10/1991 | Bourheois et al. | |
| 5,666,793 A | 9/1997 | Bottinger | |
| 5,978,720 A | 11/1999 | Hieronymus et al. | |
| 5,995,894 A * | 11/1999 | Wendte ........................ | 701/50 |
| 6,682,416 B2 * | 1/2004 | Behnke et al. ............... | 460/114 |
| 6,863,604 B2 | 3/2005 | Behnke | |
| 2002/0083695 A1* | 7/2002 | Behnke et al. ................ | 56/119 |
| 2003/0066277 A1* | 4/2003 | Behnke .................... | 56/10.2 R |
| 2003/0083757 A1* | 5/2003 | Card et al. .................... | 700/28 |
| 2005/0055646 A1 | 3/2005 | Melzer | |

FOREIGN PATENT DOCUMENTS

| | | |
|---|---|---|
| DE | 43 41 834 C1 | 4/1995 |
| DE | 44 31 824 C1 | 5/1996 |
| DE | 198 05 133 A1 | 8/1999 |
| DE | 101 47 733 A1 | 4/2003 |
| DE | 102 03 370 A1 | 7/2003 |

* cited by examiner

*Primary Examiner*—Thomas K. Pham
(74) *Attorney, Agent, or Firm*—Michael J. Striker

(57) ABSTRACT

An agricultural working machine has at least one working unit, a driver's cab; at least one display unit provided in the driver's cab and having a basic electronic viewing screen for showing a plurality of machine and/or crop parameters stored in different functionality windows, the at least one display unit being assigned to the at least one working unit, the at least one display unit with the basic electronic viewing screen and the different functionality windows being formed so that when at least one additional functionality window is open, an open functionality window is zoomed.

21 Claims, 4 Drawing Sheets

SCALABLE FUNCTIONALITY WINDOWS IN A DISPLAY UNIT

BACKGROUND OF THE INVENTION

The present invention relates to the scalability of functionality windows shown in a display unit of a terminal integrated in an agricultural working machine.

Publication DE 198 05 133 A1 discloses an electronic display and/or operating device with a display and status display fields, in the case of which the use of certain symbols makes it possible for the operating state or out-of-operation state of different working units to be displayed in the same display field. According to the invention, the out-of-operation state of a working unit is indicated, e.g., by the symbol of a line passing through the particular working unit, the line being located above the symbol provided. On the other hand, the operating state of a working unit is indicated, e.g., when a display assigned to the symbol provided illuminates. In this manner, no additional symbols are used to display the operating state or out-of-operation state. Additional symbols would reduce the amount of space available in the display.

SUMMARY OF THE INVENTION

The disadvantage of a display structure of this type is the fact that the driver of an agricultural working machine is limited in terms of the information displayed—the driver is only shown the operating state or the out-of-operation state of the working units shown. No additional information can be provided, e.g., in the form of additional display fields appearing.

In keeping with these objects and with others which will become apparent hereinafter, one feature of the present invention resides, briefly stated, in an agricultural working machine, comprising at least one working unit; a driver's cab; at least one display unit provided in said driver's cab and having a basic electronic viewing screen for showing a plurality of machine and/or crop parameters stored in different functionality windows, said at least one display unit being assigned to said at least one working unit, said at least one display unit with said basic electronic viewing screen and said different functionality windows being formed so that when at least one additional functionality window is open, an open functionality window is zoomed.

Due to the fact that opening at least one additional functionality window causes an open window to be zoomed, the driver of the agricultural working machine is able to view a large amount of different information visualized in the functionality windows without the driver having to change or exit the current basic viewing window.

In an advantageous further development of the present invention, no information is lost when an additional functionality window is opened and, as a result, an open window is zoomed. As a result, the driver of the agricultural working machine need not forgo any existing information visualized in the functionality window already open, despite the fact that the amount of information displayed has increased.

Since a functionality window is zoomed larger or smaller in size, the entire display unit of the terminal is always filled with the available functionality windows without any unnecessary gaps. A clear overview is therefore ensured at all times.

By specifying a minimum size, it is ensured that the zooming does not result in the data shown in the functionality windows becoming unreadable.

Due to the fact that at least one open functionality window increases in size when another functionality window is closed, the displayed functionality windows are made easier to read.

In an advantageous embodiment, a functionality window is zoomed automatically when a specified threshold value assigned to the particular functionality window is exceeded. The information contained in the functionality window does not become relevant until this threshold value is reached. It is then enlarged and made clearly visible to the driver.

The automatic zooming of at least one functionality window is also an advantage when an acutal value falls below a specified threshold value assigned to the functionality window, since the values below this threshold value are less significant and can therefore be shown smaller in size without the driver experiencing a disadvantage or a loss of information.

Threshold values can include machine-specific values, crop-specific values and/or the zooming factor for the functionality windows. In this manner, all relevant data and factors are taken into account in the zooming process, to ensure an optimum flow of information.

A particularly important threshold value is the critical working state of a working unit. If the engine is very close to becoming overloaded, for example, this information would be displayed to the driver of the agricultural working machine, so the driver can start to implement countermeasures in a timely manner.

Due to the fact that the machine and/or crop parameters stored in the functionality windows can be called up, the driver is able to select the corresponding functionality windows at any time and make adjustments to the called-up parameters without the flow of information being negatively affected.

To provide a better overview, the functionality windows are arranged in working groups. As a result, the driver is spared the need to search on the display unit for related machine parameters or crop parameters. The screen is also made easier to understand as a result.

Due to the fact that the functionality windows are zoomed, opened and/or closed within a working group, the essential machine parameters and crop parameters assigned to the particular working group are displayed in an interrelated manner. As a result, the space occupied in the display unit is adapted to the current display requirements and only the most relevant working groups occupy the largest amount of space in the display unit.

Due to the fact that the zooming process, opening and/or closing takes place automatically or manually, the amount of effort required by the driver is reduced, so the driver's attention is always focused on the relevant functionality windows.

Furthermore, an essential advantage is achieved by the fact that a large number of display units assigned to a large number of working units is shown in an identical display unit. As a result, by using a single display unit, information regarding a large number of working units is combined, so the driver of the agricultural working machine simultaneously has a uniform overview of all information regarding different working units. Moreover, an additional display unit is not required for the additional working unit. Costs are spared as a result. The additional display unit would also take up more space in the small driver's cab.

The readability of the display unit is also improved by the fact that the functionality windows are designed to be hidden or not to be hidden.

Within the scope of the present invention, functionality windows that cannot be hidden are understood to be functionality windows that are always shown in the display unit, in a size that can be changed.

On the other hand, functionality windows that can be hidden can be removed entirely from the display unit and then re-displayed when needed. It makes sense to assign essential information that must be viewed in functionality windows that cannot be hidden, and to assign less-relevant information to functionality windows that can be hidden.

Due to the fact that the at least one functionality window is hidden or displayed depending on machine and/or crop parameters known per se, the driver is automatically and immediately made aware of relevant machine parameters or crop parameters.

The fact that functionality windows can be hidden or displayed automatically reduces the amount of effort required by the driver and ensures a reliable supply of information.

The novel features which are considered as characteristic for the present invention are set forth in particular in the appended claims the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
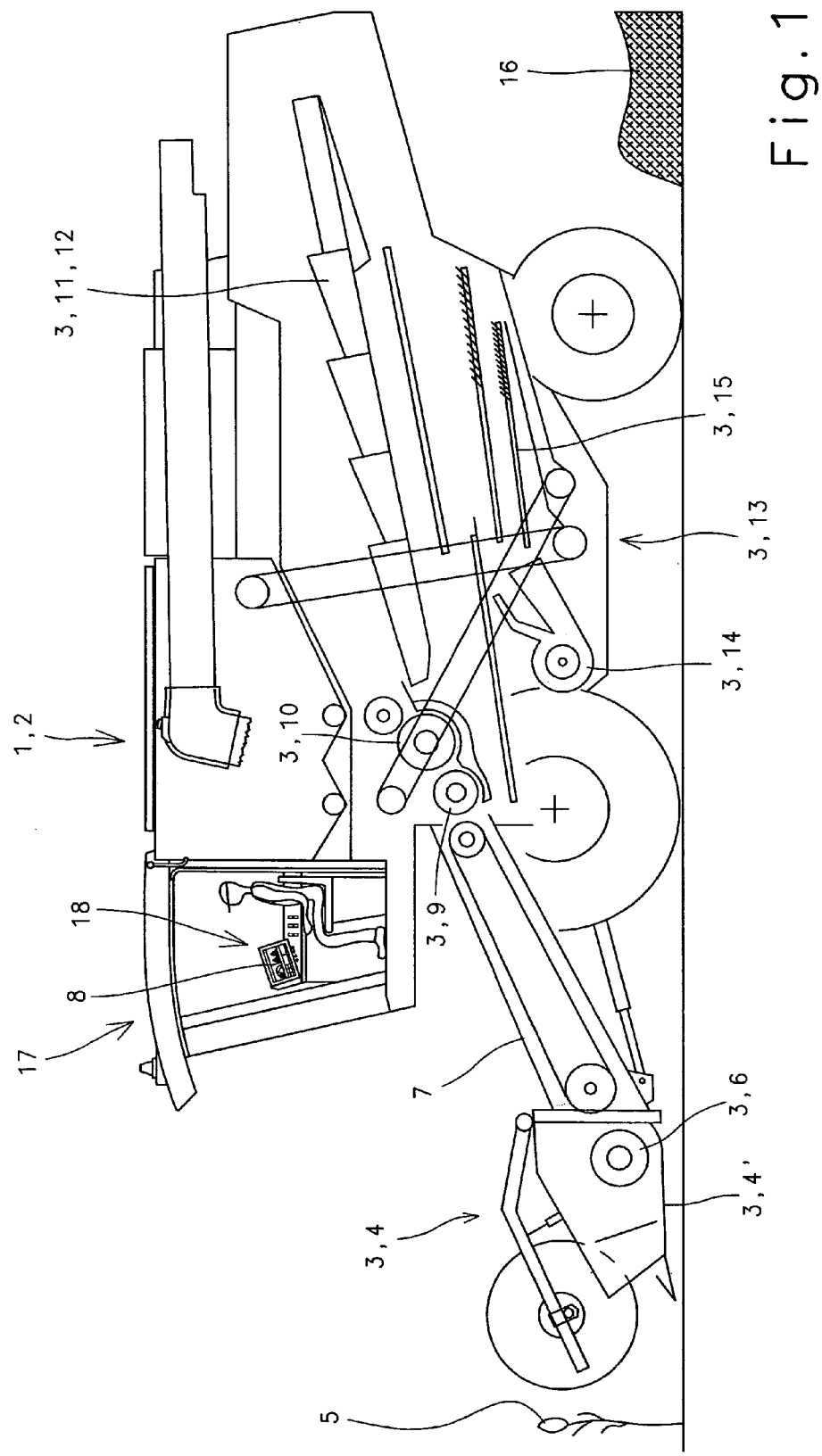
FIG. 1: shows a schematic cross section of an agricultural working machine designed as a combine harvester, and its working units

FIG. 1 shows an agricultural working machine 1 configured as a combine harvester 2, and its different working units 3. A header 4 is located in the front region of combine harvester 2. Header 4 picks up crops 5, cuts them and transfers them via a feed device 6 to downstream feed rake 7. Via feed rake 7, crops 5 are transferred in a known manner to the threshing devices. In this case, the threshing devices are composed of a first cylinder 9 and a second, downstream cylinder 10 assigned thereto.

To further separate the grain, the stream of material is conveyed to different separating devices 11 such as a tray-type shaker 12, and to different cleaning devices 13 composed substantially of a fan 14 and cleaning sieves 15, before the straw is ejected out of the back of combine harvester 2 and deposited on the ground to form a swath 16.

At a terminal 18 located in driver's cab 17, the driver of combine harvester 2 can enter settings for the different working units 3, such as the cutting width of header 4, the rotational speed of the cylinder, or the sieve opening width and, in this manner, adapt the harvesting operation to the specific crop conditions.

In addition, the driver of combine harvester 2 always has a current overview of the machine data or crop data visualized in the display unit 8 of a terminal 18 located in driver's cab 17.

Adjustment of working units 3 and the overview of the current machine and crop data is of prime importance, since, based on these parameters, the grain loss in particular that occurs during every harvesting operation can be identified and reduced considerably by correcting these parameters.

Figure 2:
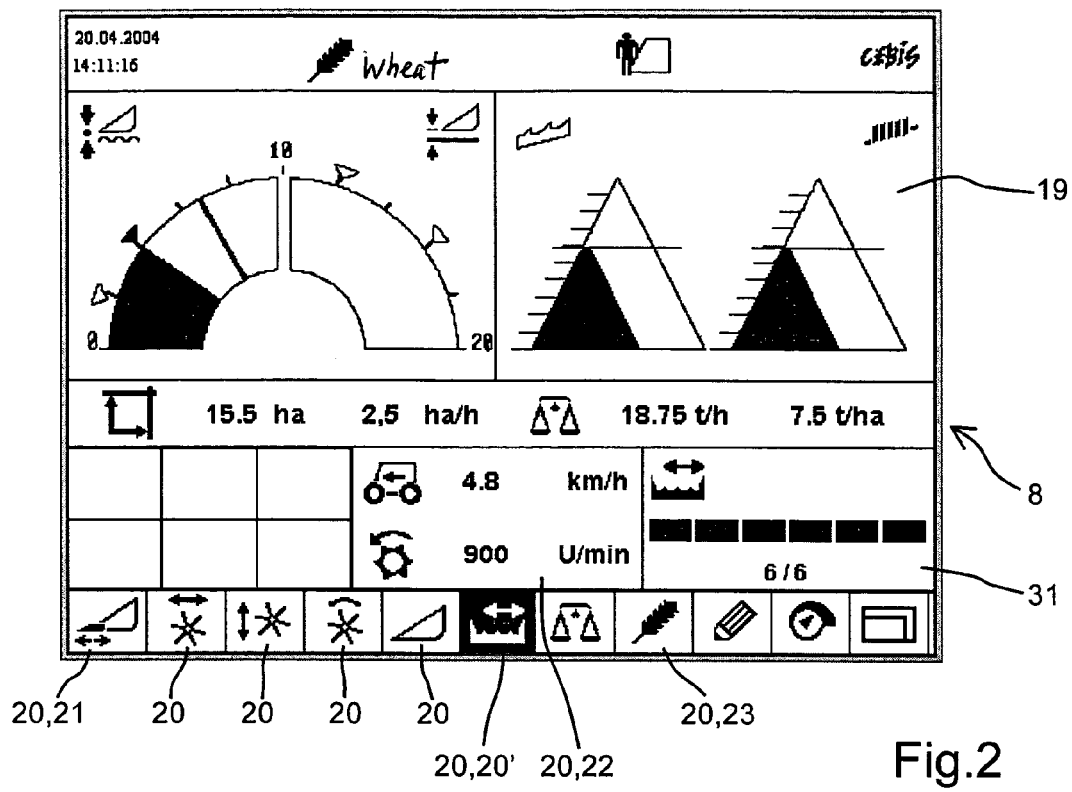
FIG. 2: shows a basic viewing window in a display unit

A basic viewing window 19 shown in display unit 8 is depicted as an example in FIG. 2. Various functionality windows 20 are shown in display unit 8. Further functionality windows 20 are possible; they are not limited to those shown here. In the current exemplary embodiment, when a functionality window 20 is selected, the background color of selected functionality window 20' changes, and selected functionality window 20' is displayed in a larger functionality window 31. In this functionality window 31, all information and functions related to different machine and/or crop parameters stored in selected functionality window 20' are displayed and can be called up and modified by the driver of combine harvester 2. For example, the position of header table 4' is displayed in functionality window 21. The ground speed of combine harvester 2 and the rotational speed of the cylinder can be read in functionality window 22. The type of crop to be harvested is displayed in another functionality window 23.

Displayed functionality windows 20 cover the entire display unit 8 of terminal 18 such that additional functionality windows 20 cannot be visualized in display unit 8. The driver of combine harvester 2 therefore only has an overview of functionality windows 20 depicted currently, even though terminal 18 contains information relevant to the driver in additional functionality windows 20. Although this information is stored in functionality windows 20 that are suppressed and therefore not visualized, but that can be called up at any time, the driver is unable to see the information stored in suppressed functionality windows 20. As such, the machine and crop parameters not shown can change, disadvantageously, without the driver becoming aware of this in a timely manner.

To provide the driver of agricultural working machine 1 with an overview of all important machine-specific and crop-specific parameters stored in functionality windows 20, basic viewing window 19 shown in FIG. 2 is zoomed in the direction of arrow 33 (FIG. 3), thereby creating blank space 24 for additional functionality windows 20 around at least a portion of basic viewing window 19.

It is also feasible, however, to zoom in any direction or to locate zoomed basic viewing window 19 in the center of display unit 8 of terminal 18, so that blank space 24 surrounds entire viewing area 19.

By creating blank space 24, space is created for stored functionality windows 20 that were previously covered by basic viewing window 19. The sum total and size of functionality windows 20 determine the amount of blank space 24 required and the size of zoomed basic viewing window 19.

The zooming process always takes place when additional process-relevant devices or methods for the current harvesting operation are selected by the driver or are automatically triggered and, as a result, are displayed. These additional data are then visualized next to basic viewing window 19 in display unit 8, so that all relevant data are displayed to the driver of agricultural working machine 1 simultaneously and without the loss of any information. It is also feasible to apply the zooming process as a function of threshold values.

The threshold values can include machine-specific parameters, such as the rotational speed of the cylinder, or crop-specific parameters, such as the moisture level of the crop material. In addition, the threshold value can automatically determine the zooming factor for particular functionality window 20, to ensure that a good overview and readability are always provided.

In an advantageous further development, the critical working state of at least one working unit 3 can be specified as the threshold value to prevent damage from occurring inside agricultural working machine 1. An example of this is the working state of the engine of agricultural working machine 1, which is not shown here. If the engine is continually driven hard and engine overload is imminent, this is clearly brought to the attention of the driver of the agricultural working machine in a corresponding functionality window 20, so the driver can intervene in the harvesting operation to make corrections, without agricultural working machine 1 coming to a complete stop.

Figure 3:
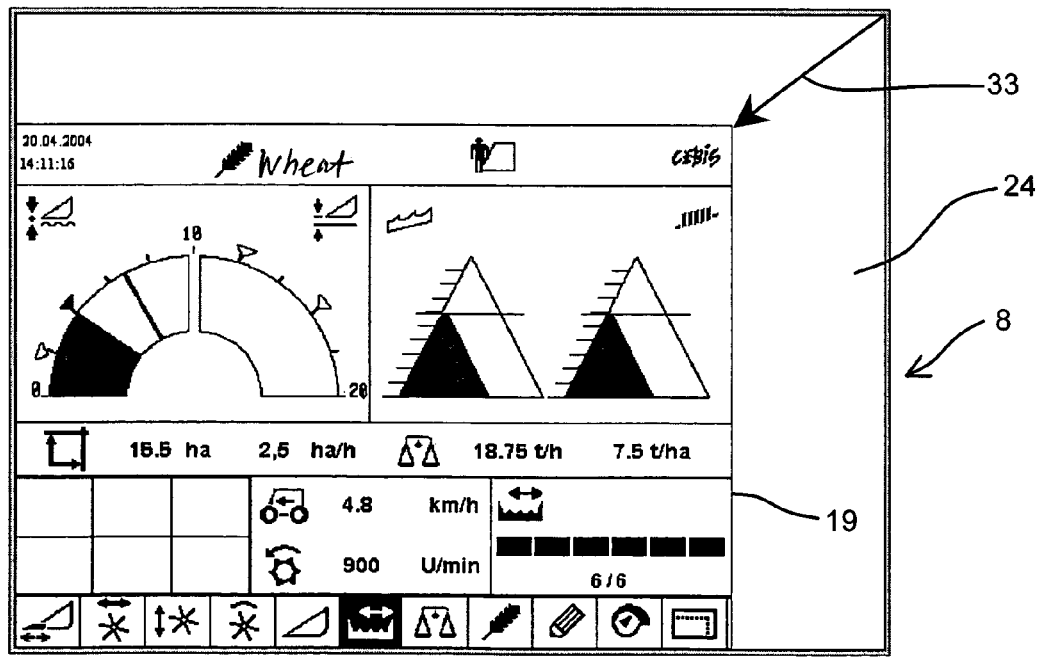
FIG. 3: shows a zoomed basic viewing window according to FIG. 2
Figure 4:
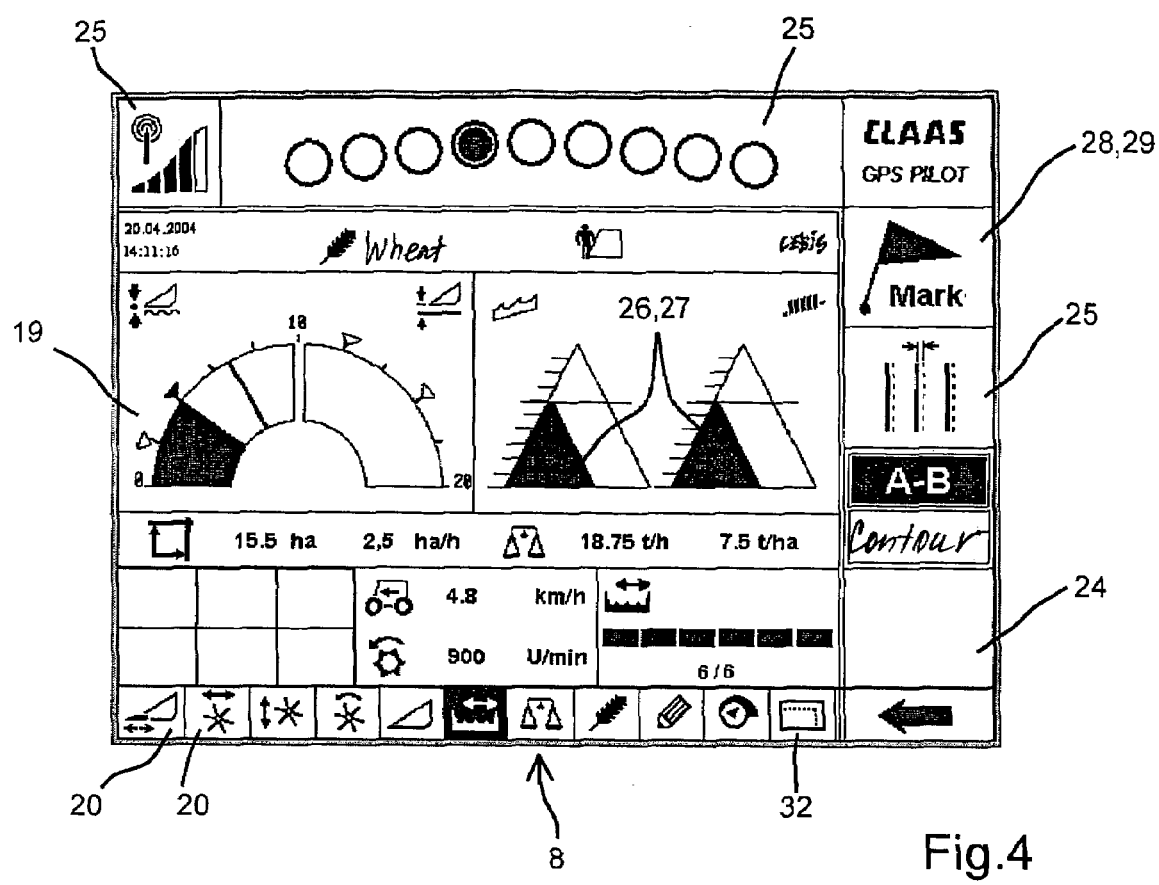
FIG. 4: shows a zoomed basic viewing window according to FIG. 3 with additional functionality windows displayed

Shown in FIG. 4 is a basic viewing window 19 zoomed as described with reference to FIG. 3, but with functionality windows 25 displayed in blank space 24. According to the present invention, opening at least one additional functionality window 25 causes the functionality window 20 already open to be zoomed. In particular, when an additional functionality window 25 is opened, functionality window 20—which is already open—is zoomed, without any information being lost. This means that, if an additional functionality window 25 is opened, blank space 24 around the area taken up by functionality window 25 becomes smaller, but the information visualized by functionality window 20 is not suppressed, nor does the displayed information become unreadable.

To ensure that the driver of combine harvester 2 can easily see and read the data visualized in functionality windows 20, 25, the minimum size of a functionality window 20, 25 is limited. Limiting the minimum size of a functionality window 20 also has the advantage that, when blank space 24 becomes full, zoomed basic viewing window 19 is re-zoomed to create more blank space 24 for additional functionality windows 25.

In an advantageous manner, the particular zooming process should take place in a dynamic manner, ensuring that functionality window 20 has the most-suitable, largest size every time.

If it should arise that agricultural working machine 1 has a very large amount of machine- and/or crop-specific functionality windows 20, 25, it has proven advantageous to design functionality windows 20, 25 as functionality windows 26, 28 that can be hidden or not hidden.

The size of functionality windows 26 that cannot be hidden is changeable and is always displayed in the display unit 8 of terminal 18. Good candidates for these functionality windows 26 are functionality windows 20 in particular that are particularly relevant to the driver of combine harvester 2 and which the driver must therefore see during the entire harvesting operation, e.g., grain loss display 27. In an advantageous manner, functionality windows 28 that cannot be hidden are enlarged when a specified threshold value is exceeded and, when an actual value falls below a specified threshold value, they are shrunk, so that functionality windows 28 that cannot be hidden always remain visible in the basic viewing window 19 to the driver of combine harvester 2. Machine-specific and crop-specific parameters known per se can be used as threshold values.

In contrast, functionality windows 28 that can be hidden are those functionality windows 28 that need not be monitored continually by the driver of agricultural working machine 1. For this reason, functionality windows 28 that can be hidden or not are actually displayed or hidden depending on machine and/or crop parameters known per se.

It is also within the scope of the present invention to allow functionality windows 28 to be hidden or displayed depending on whether an actual value exceeds or falls below a threshold value based on the parameters. This means that, if the relevant threshold value is reached, functionality window 28 is displayed. Once the actual value drops below this threshold value again, functionality window 28 disappears.

Field display 29 for a combine harvester 2 can be used as an exemplary embodiment of an adjustable functionality window 28.

Field display 29 is used to support field and yield mapping. It displays, to the driver of combine harvester 2, certain field data, such as weed-infested areas or extremely uneven ground surfaces on a certain part of a field to be worked. When this part of the field is reached, Field Display functionality window 29 is visualized in the display unit 8, and the driver has enough time to enter the necessary machine settings before the critical part of the field is reached.

After the critical part of the field has been crossed, functionality window 29 can be hidden again, so that enough blank space is created for other functionality windows 20, which can be displayed in the new blank space. It is also feasible, however, that functionality windows 20 already displayed can be enlarged to provide a better view and thereby fill the blank space.

It is also advantageous to combine functionality windows 20 into a plurality of working groups. These working groups are composed of machine-specific or crop-specific parameters. For example, a crop-specific working group can be composed of the type of crop, moisture level in the crop and density of the crop. A machine-specific working group, based on combine harvester 2 as agricultural working machine 1, can be composed, e.g., of the transverse slant of header 4, the height adjustment of header 4, and the parameter: Retract and extend cutting table 4'.

By forming a plurality of working groups composed of parameters, it is possible to provide the driver with a neat and, therefore, improved overview of all parameters stored in functionality windows 20. Furthermore, the collection of a plurality of working groups fits in the display unit, thereby saving space. That is, entire working groups can be zoomed and/or hidden or displayed in a uniform manner, so that, in this case as well, the view in display unit 8 is easy to understand and is limited to the most relevant functionality windows 20.

To reduce the amount of effort required by the driver, the zooming process can take place either automatically or manually. It is feasible, for example, for the zooming process to travel through a loop specified as a function of an established time factor or as a function of a defined sequence of displays of certain functionality windows 20. The manual zooming process can be initiated by calling up the "Manual Zoom" functionality window 32; it should be available to the driver at any time, in addition to automatic zooming, so the driver can immediately see an overview of the information he wants to see, without his having to wait for the next window to be displayed.

With reference to the exemplary embodiment shown in FIGS. 2-4, automatic track-following is displayed, as shown in functionality window 25 in FIG. 4. When track-following is selected, basic viewing window 19 shown in FIG. 2 is zoomed automatically (according to FIG. 3), so that functionality windows 25 appear in blank space 24 created by zooming, as shown in FIG. 4.

Independent of the different zooming processes, the functionalities stored in functionality windows 20 can be called up at any time, so that the driver of agricultural working machine 1 can access all applications at any time, intervene in the harvesting operation and make changes.

Figure 5:
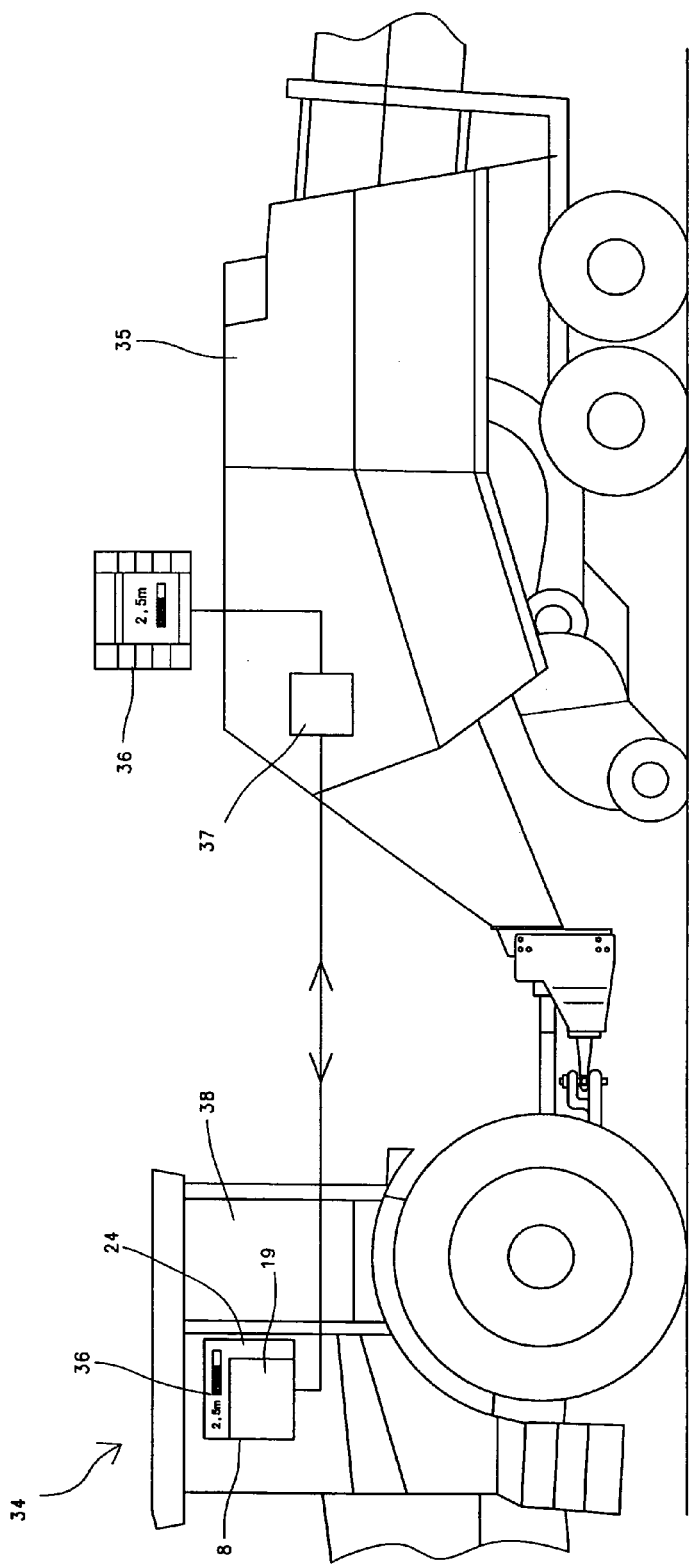
FIG. 5: shows a tractor with an adapted agricultural bale press and the display unit according to the present invention

A special embodiment of the present invention is shown in FIG. 5. FIG. 5 shows a tractor 34 with an adapted agricultural bale press 35 and a display unit 8 according to the present invention. Display unit 8 is assigned to tractor 34, and a separate display unit 36 is assigned to agricultural bale press 35. The parameters of bale press 35, such as bale length or bale density, are displayed in display unit 36 of bale press.

To ensure that the driver of tractor 34 has a uniform overview of all relevant machine-specific information regarding tractor 34, bale press 36 and crop-specific information, the data visualized in display unit 36 of agricultural bale press 35 are displayed—via control electronics 37 known per se and in the manner according to the present invention—in an identical display unit 8 located in cab 38 of tractor 34. This takes place in the manner according to the present invention and described above by the information contained in display unit 36 being transmitted to blank space 24 in identical display unit 8 located in cab 38 of tractor 34. As a result, basic viewing window 19 of display unit 8 containing the visualized, tractor-specific information is zoomed. In addition to providing a better overview for the driver of tractor 34, the presence of an identical display unit 8 makes it unnecessary to provide another display unit 8 inside cab 38. Costs are reduced as a result, and the space available inside the cab is not restricted.

ISOBUS systems are particularly well-suited for use with the present invention.

It is within the scope of the present invention for a large number of working units 3 to be assigned to a large number of display units 8, and to depict the large number of display units 8 in one shared display unit 8.

It is within the scope of the ability of one skilled in the art to modify the exemplary embodiment described in a manner not presented, or to use it in other machines to achieve the effects described, without leaving the framework of the present invention.

It will be understood that each of the elements described above, or two or more together, may also find a useful application in other types of constructions differing from the types described above.

While the invention has been illustrated and described as embodied in a scalable functionality windows in a display unit, it is not intended to be limited to the details shown, since various modifications and structural changes may be made without departing in any way from the spirit of the present invention.

Without further analysis, the foregoing will reveal fully revela the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. An agricultural working machine, comprising at least one working unit; a driver's cab; at least one display unit provided in said driver's cab and having a basic electronic viewing screen for showing a plurality of machine and/or crop parameters stored in different functionality windows, said at least one display unit being assigned to said at least one working unit, said at least one display unit with said basic electronic viewing screen and said different functionality windows being formed so that when at least one additional functionality window is open, an open functionality window is zoomed.

2. An agricultural working machine as defined in claim 1, wherein said display unit with said basic electronic viewing screen and said different functionality windows are formed so that the opening of said additional functionality window and the zooming of the open functionality window are carried out without loss of information.

3. An agricultural working machine as defined in claim 1, wherein said at least one display unit with said basic electronic viewing screen and said different functionality windows are formed so that the open functionality window is zoomed dynamically.

4. An agricultural working machine as defined in claim 1, wherein said at least one display unit with said basic electronic viewing screen and said different functionality windows are formed so that the open functionality window is zoomed to a minimum size.

5. An agricultural working machine as defined in claim 1, wherein said display unit with said basic electronic viewing screen and said different functionality windows are formed so that when an additional functionality window is closed, at least one of said open functionality windows is enlarged.

6. An agricultural working machine as defined in claim 1, wherein said display unit with said basic electronic viewing screen and said different functionality windows are formed so that when a specific threshold value assigned to one of said functionality windows is exceeded, said one functionality window zooms automatically.

7. An agricultural working machine as defined in claim 1, wherein said display unit with said basic electronic viewing screen and said different functionality windows are formed so that when an actual value falls below a specified threshold value assigned to a functionality window, said at least one functionality window zooms automatically.

8. An agricultural working machine as defined in claim 6, wherein the threshold values include parameters selected from the group consisting of machine-specific values, crop-specific values, a zoom factor for the functionality window, and combinations thereof.

9. An agricultural working machine as defined in claim 7, wherein the threshold values include parameters selected from the group consisting of machine-specific values, crop-specific values, a zoom factor for the functionality window, and combinations thereof.

10. An agricultural working machine as defined in claim 6, wherein the threshold value is a critical working state of said at least one working unit.

11. An agricultural working machine as defined in claim 7, wherein the threshold value is a critical working state of said at least one working unit.

12. An agricultural working machine as defined in claim 1, wherein said functionality windows are formed so that they store parameters selected from the group consisting of machine parameters, crop parameters, and both, which parameters are callable up.

13. An agricultural working machine as defined in claim 1, wherein said functionality windows of said basic electronic viewing screen of said at least one display unit are arranged in working groups.

14. An agricultural working machine as defined in claim 13, wherein said working groups are composed of parameters selected from the group consisting of machine-specific parameters and crop-specific parameters.

15. An agricultural working machine as defined in claim 1, wherein said functionality windows are formed so that within a working group they perform an action selected from the group consisting of zooming, opening, closing, and combinations thereof.

16. An agricultural working machine as defined in claim 15, wherein said functionality windows are formed so that said action selected from the group consisting of zooming, opening, closing and combinations thereof takes place automatically.

17. An agricultural working machine as defined in claim 15, wherein said functionality windows are formed so that said action selected from the group consisting of zooming, opening, closing and combinations thereof takes place manually.

18. An agricultural working machine as defined in claim 1; and further comprising a plurality of said working units assigned to a plurality of said display units, said plurality of display units being shown in an identical one of said display units.

19. An agricultural working machine as defined in claim 1, wherein said functionality windows are formed so that said functionality windows are windows selected from the group consisting of functionality windows that can be displayed or hidden, functionality windows that can not be hidden, and both.

20. An agricultural working machine as defined in claim 19, wherein at least one of said functionality windows which can be displayed over hidden can be displayed or hidden depending on parameters selected from the group consisting of machine parameters, crop parameters, and both.

21. An agricultural working machine as defined in claim 19, wherein at least one of said functionality windows is displayed or hidden automatically.

\* \* \* \* \*